Nov. 12, 1963   N. L. CHALFIN   3,110,216
AUTOMATIC SLIDE PROJECTOR PROGRAM CONTROL
Filed March 23, 1960   3 Sheets-Sheet 1

INVENTOR.
Norman L. Chalfin

3,110,216
AUTOMATIC SLIDE PROJECTOR PROGRAM CONTROL
Norman L. Chalfin, 460 San Juan Place, Pasadena, Calif.
Filed Mar. 23, 1960, Ser. No. 16,976
6 Claims. (Cl. 88—28)

This invention relates to the control of slide projectors and more particularly to a sound signal operated slide projector program controller.

Many slide projection mechanisms are now commercially available for the electric control of the sequence of slides to be projected. To operate these mechanisms, some prior art devices employ a pushbutton which must be manually operated each time to actuate the electric slide sequence controller for changing slides. Another form of automatic device of the prior art includes a timing clock which may be preset to actuate the sequence controller at equal predetermined intervals. The use of such devices is intended to free a lecturer, for example, so that he may discuss his slides without having to remain near the projector to change them one by one, manually. The latter eliminates the need to operate a pushbutton switch. However, some commentaries for particular slides may be of greater duration than others. When an equal time control is used, a dead silence interval is created between slides for short commentaries or the automatic changing of a slide occurs before the commentary for that slide has been completed.

This invention contemplates the automatic projection of slides with an automatic electric slide changer operated under the control of signals recorded on a magnetic tape or disc. The signals are applied to a novel signal actuated controller for the electric slide changer. The same tape or disc contains the recorded commentary. The recorded sound signal for changing the slides and the sound signal of the commentary are each, respectively, on separate tracks of the magnetic tape or disc. The slide changing signal appears on the tape or disc only at the appropriate time during the commentary when a slide should be changed. The device which controls the slide changing mechanism in response to the signals can also be used to generate the control signal on the recording medium.

Accordingly, it is an object of this invention to provide an automatic sound signal actuated controller for electric slide changers for lantern slide projectors.

It is another object of this invention to provide in combination with a lantern slide projector having an electric changer for the slides, a controller for the electric changer, responsive to a recorded signal.

It is a further object of this invention to provide a more convenient slide projector program controller incorporating a novel sound operated relay device.

It is still another object of this invention to provide a sound signal controlled relay device which is normally passive and is actuated by a predetermined tone signal, said device being selectively capable of generating the predetermined tone signal.

It is a still further object of this invention to provide a slide projector program controller in combination with a dual track tape or disc recording and playback mechanism to operate the slide projector automatically while presenting a recorded commentary related to the slides being projected, the same controller being selectively capable of providing the signal to be recorded on the tapes or discs and operating the slide changer as well.

These and other objects of this invention will become more evident from the specifications which follow, taken together with the accompanying drawings and from the appended claims.

As has been discussed above, this invention incorporates the use of a dual-track magnetic tape or disc recorder and playback mechanism together with a novel passive sound signal actuated relay controller to automatically operate an electric changer for a lantern slide projector to provide a synchronized commentary and slide changing control signal. It further provides means for generating the control signal to be recorded on the tape or disc.

Figure 1:
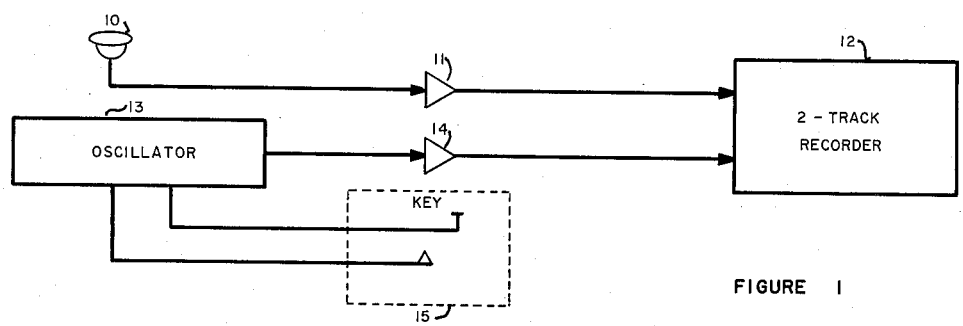
FIGURE 1 is a block diagram of a method for providing a tape or disc recording to be used in conjunction with a controller according to this invention.

In FIGURE 1, there s shown a typical arrangement of a dual track magnetic tape or disc recorder for producing a control signal and commentary record for use according to this invention. A microphone 10 is connected to an amplifier 11, which is connected to a recorder 12 to actuate one of the recording heads thereof. Recorder 12 can be any one of many commercially available types of magnetic tape or disc recorders generally called "stereo" recorders. These are provided with two channels by which two independent signals may be recorded on the tape. The recorder 12 could be a disc recorder for the newly announced "stereo" disc records in which signals of two sound channels are recorded in the opposite walls of a single groove of the disc. These signals may also be independent signals.

An oscillator 13, capable of generating a signal within the range of frequencies that the recorder can accept, is connected to a second amplifier 14. Amplifier 14 is connected to recorder 12 to activate the second of its recording heads. Oscillator 13 is arranged to be normally inoperative. A key 15 or control switch is provided which, when depressed or closed, actuates oscillator 13 to impress a signal on the tape recorder 12. The frequency of this signal may be of any value which the recording system can accept and reproduce.

When the two-track recorder 12 is used with the arrangement described above, a recording of a commentary can be made by speaking the commentary through microphone 10 into amplifier 11 to excite the first track recording head of recorder 12. An oscillation or "beep" tone is recorded with the second track recording head each time key 15 is closed to actuate oscillator 13. The result is a recording on the appropriate track of the two tracks of either the tape or the disc. One track provides a commentary and the other track provides a sound control signal occurring at the properly spaced intervals in synchronism with the end of, or at a particular point in, each segment of the commentary.

Figure 2:
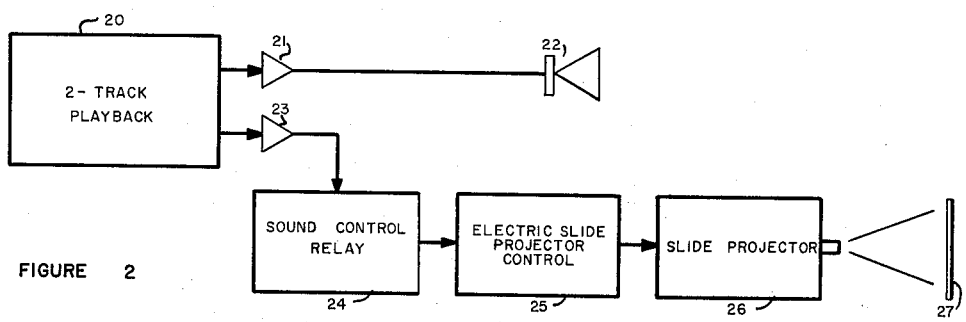
FIGURE 2 is a block diagram of a method of interconnecting the tape or disc playback with the controller according to this invention.

In FIGURE 2, there is shown a block diagram of a playback system for utilizing the recording made as described above. This recording is used to program the sequence of lantern slides assembled in a magazine which is inserted in an electric slide changing mechanism of a slide projector.

A two-track playback mechanism 20 may be either a magnetic tape playback or a disc playback system which has a dual playback head or phonograph pickup with which an independent signal may be derived, respectively, from each track of the recording such as that made with the equipment of the recorder illustrated and described in FIGURE 1.

One of the playback heads or pickups of two-track playback unit 20 is connected to an amplifier 21 which has a loud speaker system 22 connected to it. Amplifier 21 and speaker system 22 provide reproduction of the recorded commentary so that it may be heard while a slide is being projected according to this invention.

The other playback head or pickup of playback unit 20 is connected to an amplifier 23 which in turn is connected to a novel tone signal actuated control relay 24. Control relay 24 is described in further detail below and shown in circuit detail in FIGURE 3. Control relay 24 is connected to an electric slide changer 25. Electric slide changer 25 is mechanically coupled with and includes a magazine mechanism that holds a quantity of slides. Such magazine mechanisms are well known to the art and may be used interchangeably with many types of slide changers. Many "automatic" projectors are equipped with integral changing mechanisms. The electric changer such as at 25 is inserted in or is part of a commercial slide projector such as at 26 for projection of the slides on a screen 27.

Slide projector mechanisms for electrically changing slides such as indicated at 25 are of several types that are available commercially. Some have motor driven mechanisms with notched cam controls and a pushbutton override switch to start the motor which then goes through one revolution to revolve the cam through a changing cycle. At the completion of the cycle, the notch in the cam permits operation of a shut-off switch and the system is not operative until the next actuation of the pushbutton. Another form of mechanism for changing slides uses a solenoid operated lever mechanism which is actuated each time a pushbutton switch is closed. In any case, an external plug connection is provided to receive the cord of the pushbutton or other actuating switch normally used with such devices.

The control relay 24 of this invention provides the switch operation corresponding to the override pushbutton switch or the solenoid actuating switch described above. It is responsive to sound signals from a tape or disc recording.

Figure 3:
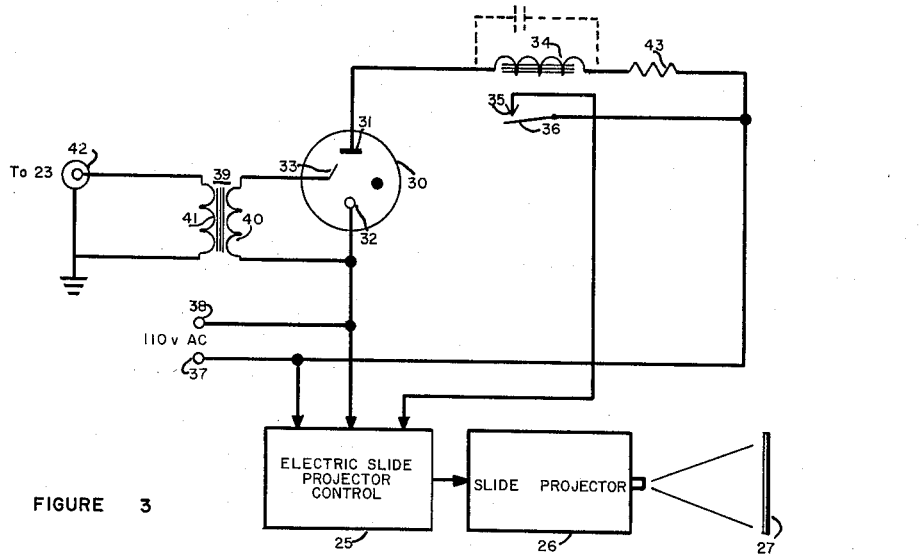
FIGURE 3 is a circuit diagram of the sound signal operated controller according to this invention.

The circuit of sound controlled relay 24, shown in FIGURE 3 includes a cold cathode gas triode 30 having an anode 31, a cathode 32 and a triggering electrode 33. A typical cold cathode triode which may be used for this service is the OA4G or the 5823. Transistor devices are also available for triggered operation substantially the same as that of the OA4G or 5823 or similar "Thyratron" types of devices. A relay 34 having contacts 35 and 36 is connected between anode 31 of triode 30 and one side 37 of a power line through a resistor 43. The other side 38 of the power line is connected to the cathode 32 of triode 30. Resistor 43 may alternatively be used between anode 31 and relay 34. In either connection, it is a series current limiting device.

A step-up transformer 39 is connected by its secondary 40 between triggering electrode 33 and cathode 32 of triode 30. In some situations, the end of secondary 40 shown connected to cathode 32 may instead be connected to a point on a voltage divider between cathode 32 and line terminal 38. The center-tapped primary 41 of transformer 39 is connected to an input connection 42. The use of center tap 41a is described below. If transistor devices are used for the operation as set forth above, the transformers such as 39 would be employed in the same manner. The ratio of primary to secondary may differ for the transistor "Thyratron" use since they require less drive signal than the OA4G or its homologues.

Contact 36 of relay 34 is connected to one side 37 of the power line. Contact 35 is connected to the circuit of the electric slide changer 25 to be controlled. Thus, slide changer 25 is connected between power connections 37 and 38 and relay connections 35 and 36 in such fashion that when relay 34 is energized, contacts 35 and 36 close to actuate electric changer 25.

The operation of triggered triode 30 is such that power connections 37 and 38 are connected between anode 31 and cathode 32 at all times, anode 31 being connected to power line terminal 37 through the coil of relay 34, and resistor 43. In the absence of any signal between triggering electrode 33 and cathode 32, triode 30 is nonconducting and relay 34 is de-energized. A tone signal of from 70 to 90 volts amplitude is required to be applied between triggering electrode 33 and cathode 32 in order to render triode 30 conducting if an OA4G is used. Other devices may require a lower triggering signal voltage. When a signal of appropriate amplitude is applied to input connection 42 from amplifier 23 or any other source, it is stepped-up by transformer 39 and applied to trigger electrode 33 to render triode 30 conducting. Some devices may not require a stepped-up voltage. In that case, transformer 39 is merely an isolation transformer. Relay 34 is thereby energized and contacts 35 and 36 close to apply potential from line connections 37 and 38 to operate electric slide projector control 25 over one change cycle. The sound signal from amplifier 23 may be merely a "beep" tone or any A.-C. signal of short duration derived from a signal recorded on the disc or tape such as discussed above. The controller 24 is actuated only for the duration of the "beep" tone or control signal which need only be of sufficient duration to initiate the change cycle of the slide changing mechanism.

Figure 4:
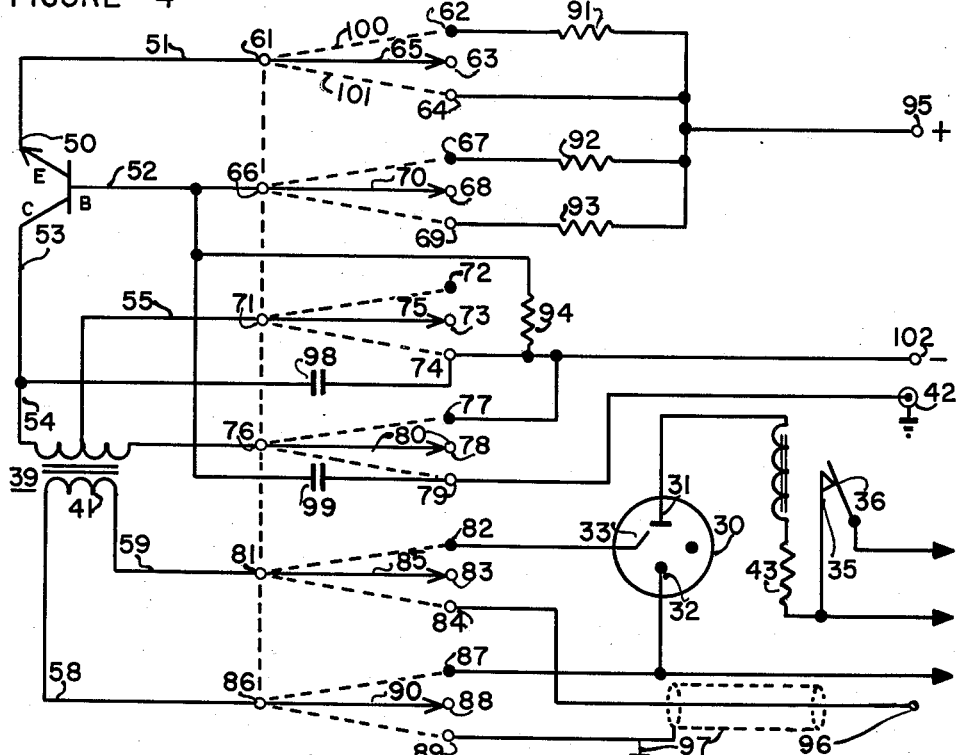
FIGURE 4 is a schematic circuit diagram of a further embodiment of the invention, showing the switch for alternative uses of the circuit.

Referring now to FIGURE 4, a transistor device is shown wired to a switching mechanism and transformer so as to be used in one mode as an amplifier for connection with the control channel 23 in place of sound control relay 24 as shown in FIGURE 2, and in another mode as the oscillator 13 incorporating key 15 of FIGURE 1 and being then connected to amplifier 14 of FIGURE 1 so that the "beep" tone may be generated and recorded onto the control track of the recording medium (either tape or disc) as previously described.

The transistor 50 is identified in FIGURE 4 by its elements "B" for base having a connection 52 thereto, "C" for collector having a connection 53 thereto, and "E" for emitter having a connection 51 thereto. A six-pole three-position switch is identified by its switch arm terminals 61, 66, 71, 76, 81, 86. Switch arm terminal 61 is connected with arm 65, terminal 66 with arm 70, terminal 71 with arm 75, terminal 76 with arm 80, terminal 81 with arm 85, and terminal 86 with arm 90. Arms 65, 70, 75, 80, 85, 90 are each shown in the position for which the system is inoperative or "off." From the inoperative position, switch arms 65, 70, 75, 80, 85, 90 may be moved to a fixed position upward as shown at dashed line 100 and the corresponding dashed lines on each switch arm, or a momentary position downward as shown at dashed line 101 and the corresponding dashed lines on each switch arm. In the position 100, a fixed position, the system is in an amplifier mode of operation corresponding to the circuit shown in FIGURE 5a to be described below. In the position 101, a momentary position, the system is in the oscillator mode of operation as shown in the circuit of FIGURE 5b, also to be described below.

For the connections defining the amplifier mode of operation, reference is had to both the switch arm positions upward as identified by dashed line 100 in FIGURE 4, and to FIGURE 5a. It may be seen that in this position, one end of resistor 91 is connected through switch terminal 62, switch arm 65, and terminal 61 to emitter connection 51 of transistor 50. The other end of resistor 91 is connected to one terminal 95 of a source of potential for the transistor. One terminal of resistor 92 is connected through terminal 67, arm 70, terminal 66 to base connection 52 of transistor 50. The other end of resistor 92 is connected to potential source terminal 95. An input terminal 42 is connected through a terminal 79 and capacitor 99 to base connection 52 of transistor 50. The collector terminal 53 of transistor 50 is connected to one end 54 of primary 41 of transformer 39, previously described, the other end of the primary 41 is connected through arm terminal 76, arm 80 and terminal 77 to the other end 102 of the potential source for the transistor. Resistor 94 connects between base connection 52 and terminal 102 of the potential source forming in series with resistor 92 a potential divider across the potential source 95, 102. The junction of resistors 92, 94 being connected to base connection 52. The center tap connection 41a of transformer primary 41 is open in this amplifier mode of operation.

Leads 59 and 58 of secondary 40 of transformer 39 are connected to switch arm terminals 81 and 86, respectively. In the amplifier mode, lead 59 connects through arm 85 to terminal 82 and triggering electrode 33 of relay tube 30. Lead 58 is connected through terminal 86, arm 90 and terminal 87 to cathode 32 of relay tube 30 and to one end 38 of the power connection for the relay tube previously described.

Thus, it may be seen that in switch position identified by dashed lines 100, the circuit of FIGURE 5a is formed to provide a single stage transistor amplifier having a capacitor coupled input 42, 99 to its base connection 52, resistor 91 forming an emitter current limiting resistor across which emitter bias is developed, resistor 92 is connected in series with resistor 94 to form a voltage divider across potential source 95, 102, resistor 92 being substantially larger than base resistor 94 so that an appropriate bias is provided to the base B of the transistor 50, the collector C of the transistor amplifier is the output terminal and by transformer coupling through appropriate step-up or impedance matching provides an appropriate signal to trigger gas relay tube 30 each time a signal is applied to input terminal 42. Each time relay tube 30 is triggered, relay 34 is actuated to close, as shown at 35, 36, to apply power to an automatic slide projector control circuit such as 25 in FIGURES 2 and 3.

To define the oscillator operation of the system shown in FIGURE 4, reference is made also to the circuit of FIGURE 5b, considered together with FIGURE 4. For the oscillator operation, all switch arms 65, 70, 75, 80, 85, 90 are down, in the position shown by dashed lines 101.

In the oscillator mode, emitter E of transistor 50 is connected through its connection 51, terminal 61, arms 65 and terminal 64, directly to terminal 95 of the potential source 95, 102.

Base B of transistor 50 is connected through its connection 52, terminal 66, arm 70 and terminal 69 to one end of resistor 93. The other end of resistor 93 is connected to terminal 102 of power source 95, 102.

Collector C of transistor 50 is connected by its terminal 53 to lead 54 of winding 41 of transformer 39. The center tap of winding 41 on lead 55 is connected through terminal 71, arm 75 and terminal 74 to terminal 102 of power source 95, 102. Capacitor 98 is connected across the collector half 54—55 of winding 41 of transformer 39. Capacitor 99 is connected between base terminal 52 and terminal 79 of the switch through switch arms 80 and terminal 76 to the return end of winding 41. Secondary winding 40 of transformer 39 has leads 58 and 59 connected as output leads through switch arm terminals 86 and 81 and switch arms 90 and 95 to terminals 89 and 83. Terminal 89 connects to ground 97 and to shield 96 of the output cable consisting of shield 96 and inner conductor 103 connected to terminal 84.

It may be seen that in the oscillator mode of operation (FIGURE 4 and FIGURE 5b), transistor 50 is connected as a Hartley oscillator with the collector winding being formed from the half of transformer secondary having leads 54 and 55 with capacitor 98 acting as a tuning element to resonate the winding to a frequency determined by the inductance of the winding between terminals 54 and 55 and the capacitance of capacitor 98. Capacitor 98 couples the second half of winding 41 to the base of transistor 50 providing collector to base coupling through the coupling of the two halves of the center tapped winding 41. The emitter E is "grounded" or at zero signal potential and the base bias is provided by the series connection of resistors 93 and 94 across the power source terminals 95 and 102. The junction of resistors 94 and 93 is connected to the base. The operation of a vacuum tube Hartley oscillator wherein there is a coupling through a center tapped winding between plate and grid, the tap being a zero signal potential, is well known. The action of a transistor Hartley oscillator is similar, the base corresponding to the vacuum tube grid, the emitter to the cathode and the collector to the plate.

Since transistors are instantly operative upon application of the power to a transistor circuit, it is merely necessary in operating the circuit above described as an oscillator to press the switch to momentary position (101) to set the oscillator mode of operation in action. It will oscillate for the duration of the time during which the switch is held in this position. Although not entirely so shown above, the switch used in a model of the unit described above and shown in FIGURES 4 and 5 was a three-position, six-pole switch which had a center position and an upper position as at 100 which was detented to remain in this position when so placed, so that amplifier action was continuous. The center position was an "off" position. None of the center terminals 63, 68, 73, 78, 83, 88 as may be seen in FIGURE 4, were used. The lower position as at 101 was spring loaded so as to return the arms 65, 70, 75, 80, 85, 90 to the center positions when released. Therefore, the switch arm positions on the panel provided were marked "Amplifier," "Off" and "Key" because in pushing to the lower position, the switch arm could be operated as a transmitter key—that is, push down to cause oscillations, release to stop them.

Thus, the switch arm provides the function defined for key 15, shown schematically in FIGURE 1, to provide the oscillator "on-off" control for recording the oscillation or "beep" tone on the second track of the tape. In this operation of the circuit of FIGURE 5b, terminals 97 and 103 would be connected to amplifier 14.

Figure 5:
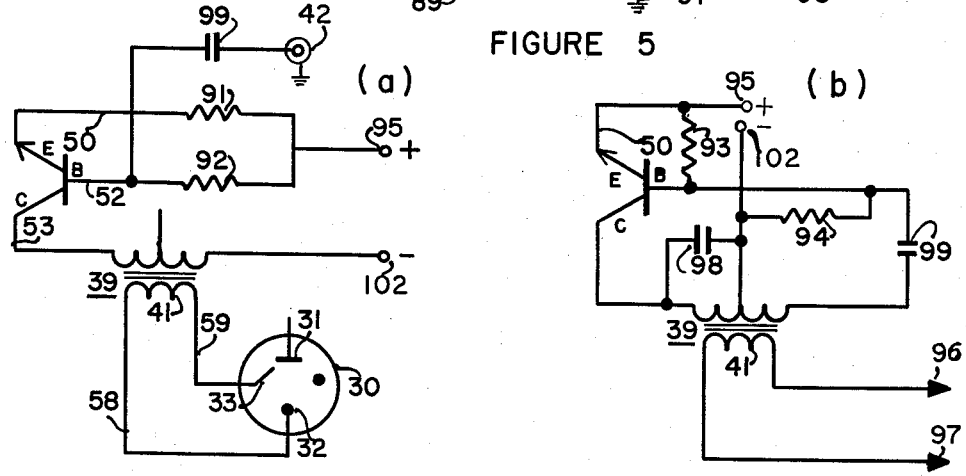
FIGURE 5a is a schematic circuit diagram for one switch position of the embodiment of FIGURE 4.
FIGURE 5b is a schematic circuit diagram of the other switch position of the embodiment of FIGURE 4.
Figure 6:
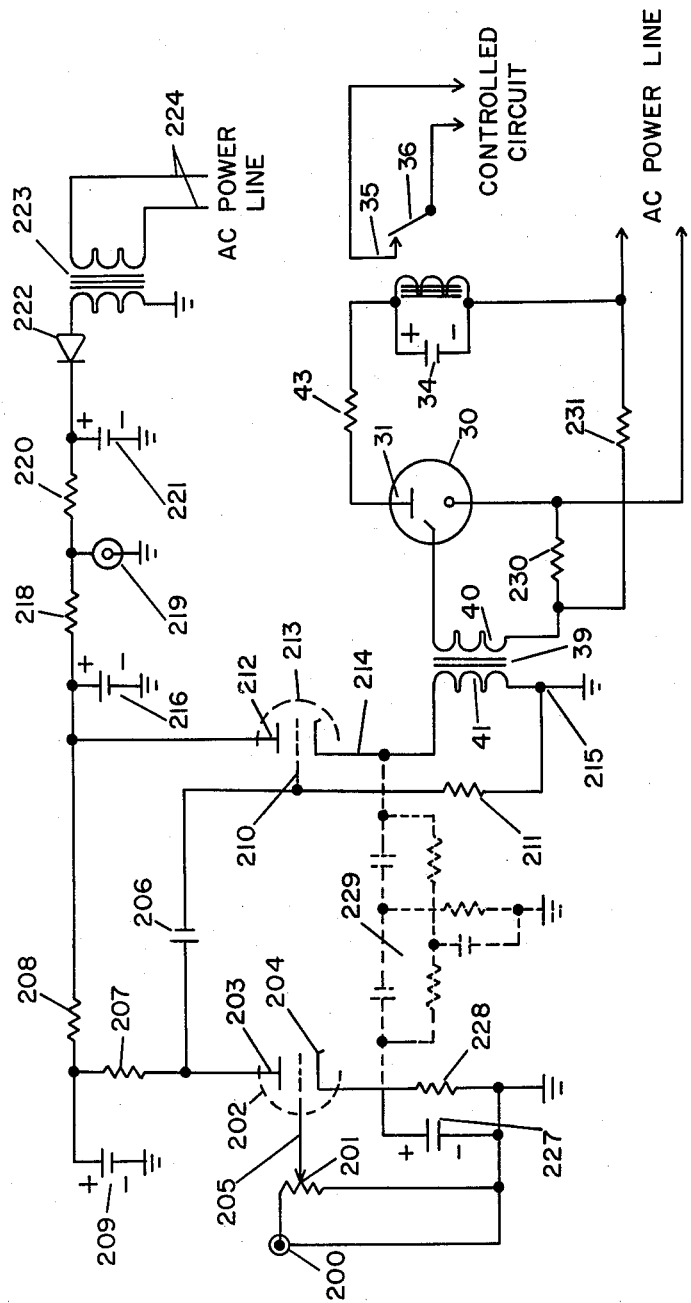
FIGURE 6 is a schematic circuit diagram of an amplifier and control unit adapted particularly to use with phonograph records.

Referring now to FIGURE 6, there is shown a schematic diagram of a tone signal responsive circuit of a type according to this invention which can be used with a stereophonic record and a pickup responsive to the stereophonic grooves on such a record. In the circuit of FIGURE 6, an input connector 200 is shown across which a potentiometer 201 is connected. One end of potentiometer 201 is grounded at 215. The slide wire 205 of potentiometer 201 is connected to the control grid of a triode 202. A bias resistor 227 and by-pass capacitor 228 are both connected between cathode 204 of triode 202 and ground 215. An anode load resistor 207 is connected between anode 203 of triode 202 and a resistor 208. A filter capacitor 209 is connected from the junction of resistors 207 and 208 to ground. Resistor 208 is also connected to anode 212 of a cathode follower amplifier 213. A capacitor 206 is connected between anode 203 of triode amplifier 202 and the control grid 210 of cathode follower amplifier 213. A grid leak resistor 211 is connected between control grid 210 of cathode follower 213 and ground at 215. The primary 41 of a step-up transformer 39 similar to that shown in FIGURES 3, 4 and 5 is connected between cathode 214 and ground 215. The secondary 40 of transformer 39 is connected between the control electrode of thyratron 30 and the junction of resistors 230 and 231 which form a voltage divider across the A.-C. power line. The remainder of the connections to thyratron or gas trigger tube 30 are the same as shown in FIGURES 3, 4 and 5.

The primary 224 of a power transformer 223 is connected to the A.-C. power line. The secondary of transformer 223 is connected to the anode of a diode rectifier 222 and to ground. The cathode of rectifier 222 is connected to one end of a dropping resistor 220 and the positive terminal of a filter capacitor 221. The other end of a capacitor 221 is connected to ground 215. A regulator 219 is connected between the other end of resistor 220 and ground 215. A filter resistor 218 is connected between resistor 220 and anode 212 of cathode follower 213. A filter capacitor 216 is connected between anode 212 and ground 215.

Network 229 is a "twin T" frequency filter. It may be connected between cathode 204 of amplifier 202 and cathode 214 of cathode follower 213, as further described below.

The operation of the circuit of FIGURE 6 is as follows: One channel of a stereophonic phonograph pickup is connected to input connector 200. This channel is designed to pick up the control tone recorded on a stereophonic phonograph disc according to this invention. Amplifier 202 amplifies the tone signals. The input level may be adjusted by potentiometer 201. The amplified signal is applied to cathode follower 213 across capacitor 206. This signal appears in the primary 41 of transformer 39. The step-up action of transformer 39 raises the potential of the signal to a sufficient level to actuate gas trigger tube 30. Relay 34 in the anode circuit of trigger tube 30 is actuated to control slide changer mechanisms, as previously described.

It should be noted that the circuit of FIGURE 6 may also be used as a voice operated relay circuit which can be connected to recording machines, or radio transmitters, to maintain them in operation only when voice signals or other sound or tone signal inputs are applied to connector 200. When used in such an operation, the controlled circuit may be a plate supply to a transmitter, or it may be a clutch mechanism of a magnetic tape recorder. The reason the circuit may be so used is that so long as a tone signal or voice signal is present at the input 200, relay contacts 35 and 36 remain closed. For a period of time after the tone signal ceases, capacitor across relay 34 holds the relay energized. This period is a function of the value of the capacitor across relay 34. The greater the capacity value, the longer the contacts 35 and 36 are held closed.

There has been described above a novel system for the automatic presentation of lantern slide programs and recorded commentaries and a method and apparatus for preparing the recordings by which the system may be effectively controlled and operated.

The system includes a dual track recording medium, equipment incorporating two recording amplifiers and recorders for recording on each track, respectively, of the medium, and a control signal generator with alternative operability as an automatic slide projector control device, the dual functions being simply and selectively had by the mere operation of a switch arm. In addition, the system for recording would have a microphone connected to one of the amplifiers for the voice commentary to be recorded on one track, and means for connecting the dual function amplifier oscillator to the other amplifier to record the oscillation on the other track each time a switch arm key is depressed.

For presenting the recorded program, the system can use a dual track pickup or playback device, the same amplifiers and a loudspeaker connected to one of the amplifiers which is connected with the element of the dual track or "stereo" pickup oriented to receive the commentary channel. The second amplifier is connected to the other element of the pickup which receives the "beep" tone channel and has the control device connected in its amplifier mode connected to it. The control device output is connected to an automatic slide projection push button control input in place of the push button or in place of an electric uniform interval timer switch control.

The resulting program will have a series of lantern slides projected in a sequence controlled by the recorded "beep" tone signals while a recorded voice commentary is presented simultaneously and in perfect synchronism with the slides.

What is claimed as new is:

1. For use with a dual track recording and reproducing device and an automatic slide changing projector, a control signal generating and reproducing device comprising:

an electron device having elements therein alternatively connectable to circuit components for amplifier or oscillator operation;

a manually selective switch having a first fixed position, a second fixed position and a momentary spring-return position, said switch being switchable among said first, second and momentary positions;

first circuit component means connected between said electron device and said manually selective switch in said first fixed position thereof thereby to interconnect said elements of said electron device with said component means for amplifier operation of said electron device when said switch is positioned in said first fixed position;

second circuit component means connected between said electron device and said manually selective switch in said momentary spring-return position thereof thereby to interconnect said elements of said electron device with said components for oscillator operation of said electron device when said switch is in said momentary spring-return position;

said second fixed position of said manually selective swich being an "off" position of said control signal generating and reproducing device;

a normally inoperative relay circuit connected with said first and said second component means, said relay circuit being responsive to oscillations developed in said electron device in said oscillator operation and in said amplifier operation thereof to become energized, said relay circuit being connected to said automatic slide changing projector;

an input circuit connected to said electron device through said manually selective switch in said first fixed position thereof and to the reproducing output of one track of said dual track recording and reproducing device; and an output circuit connected to said electron device through said manually selective switch in said momentary spring-return position thereof to the recording input of said one track of said dual track recording and reproducing device, whereby when said manually selective switch is in said first fixed position thereof, said electron device amplifies recorded oscillations from said one track of said dual track recording and reproducing device to energize said relay circuit and thereby operate said automatic slide changing projector mechanism and when said manually selective switch is momentarily placed in the momentary position thereof, said electron device generates oscillations which are recorded on said one track by said recording and reproducing device while at the same time said relay circuit is energized to operate said automatic slide changing projector mechanism, said recorded signals being subsequently reproducible to reconstruct the slide sequence in synchronism with any voice recordings made on the other track of said recording.

2. For use with a dual track recording and reproducing device and an automatic slide changing projector, a unitary control signal generating and reproducing device comprising:
- an electronic device connectable for amplifier or oscillator operation;
- a manually selective switch having a first fixed position, a second fixed position and a momentary spring-return position;
- circuit component means connected to said electron device and to said manually selective switch in said first fixed position thereof for amplifier operation thereof, and to said manually selective switch in said third momentary spring-return position thereof for oscillator operation thereof;
- said manually selective switch being "off" in said second fixed position thereof; and
- a normally inoperative relay circuit connected with said circuit component means and being responsive to oscillations developed in said electron device to become energized, said relay circuit being connected to said automatic slide changing projector, said electron device being connected through said manually selective switch in said first fixed position thereof to the output of one track of said recording and reproducing device and through said manually selective switch in said momentary spring-return position thereof, to the input of said one track of said recording and reproducing device, whereby when said manually selective switch is in said first fixed position thereof, said electron device amplifies recorded oscillations from said recording and reproducing device to energize said relay circuit and operate said projector slide changing mechanism and when said manually selective switch is momentarily placed in the momentary position thereof said electron device generates oscillations which are recorded by said recording and reproducing device while at the same time said relay circuit is energized to operate said automatic slide projector, said recorded signals being subsequently reproducible to reconstruct the slide sequence.

3. For use with a dual track recording and reproducing device and an automatic slide changing projector, an electron device for generating and reproducing a control signal, said device comprising:
- a manually selective switch having a first fixed position, a second fixed position and a momentary spring-return position;
- first circuit component means connecting said electron device with said manually selectve switch in said first fixed position thereof for amplifier operation of said electron device;
- second circuit component means connecting said electron device with said manually selective switch in said third momentary spring-return position thereof for oscillator operation of said electron device;
- said manually selective switch being "off" in said second fixed position thereof; and
- a relay circuit being normally inoperative in the absence of any signal developed in said electron device and being connected with said first and second circuit means respectively to be responsive to oscillations developed in said electron device in said oscillator operation or in said amplifier operation thereof to become energized, said relay circuit being connected to said automatic slide changing projector whereby when said manually selective switch is in said first fixed position thereof, said electron device amplifies recorded oscillations from an external recording and reproducing device connected thereto to energize said relay circuit and operate said projector slide changing mechanism and when said manually selective switch is momentarily placed in the momentary position thereof said electron device generates oscillations which may be recorded on said external recording and reproducing device while at the same time said relay circuit is energized to operate said slide projector changing mechanism, said recorded signals being subsequently reproducible to reproduce the slide sequence.

4. For use with a dual track recording and reproducing device and an automatic slide changing projector, a control signal generating and reproducing device comprising:
- a semiconductor device having elements therein connectable to circuit components for amplifier or oscillator operation of said device;
- a manually selective switch having a first fixed position, a second fixed position and a momentary spring-return position;
- first circuit component means connected to said semiconductor device and to said manually selective switch in said first fixed position thereof and adapted to interconnect said elements of said semiconductor device for amplifier operation thereof;
- second circuit component means connected to said semiconductor device and to said manually selective switch in said third momentary spring-return position thereof and adapted to interconnect said elements of said semiconductor device for oscillator operation thereof;
- said second fixed position of said manually selective switch being an "off" position of said control signal generating and reproducing device;
- a normally inoperative relay circuit connected with said first and said second circuit means and adapted to be responsive to oscillations developed in said semiconductor device in said oscillator operation or in said amplifier operation thereof to become energized, said relay circuit being connected to said automatic slide changing projector;
- an input circuit connected to said semiconductor device through said manually selective switch in said first fixed position thereof to the output of one track of said recording and reproducing device; and
- an output circuit connected to said semiconductor device through said manually selective switch in said momentary spring-return position thereof to the input of said one track of said recording and reproducing device, whereby when said manually selective switch is in said first fixed position thereof, said semiconductor device amplifies recorded oscillations from said recording and reproducing device to energize said relay circuit and operate said slide projector changing mechanism and when said normally selective switch is momentarily placed in the momentary position thereof said semiconductor device generates oscillations which are recorded by said recording and reproducing device while at the same time energizing said relay circuit to operate said slide projector, said recorded signals being subsequently reproducible to repeat the slide sequence.

5. For use with a dual track recording and reproducing device and an automatic slide changing projector, a control signal generating and reproducing device comprising:
- a transistor device having elements therein connectable to circuit components for amplifier or oscillator operation;
- a manually selective switch having a first fixed position, a second fixed position and a momentary spring-return position;
- first circuit component means connected to said transistor device and to said manually selective switch in said first fixed position thereof for amplifier operation thereof;
- second circuit component means connected to said transistor device and to said manually selective switch in said third momentary spring-return position thereof for oscillator operation thereof;

said manually selective switch being "off" in said second fixed position thereof; and a normally inoperative relay circuit connected with said first and second circuit means and with said slide projector, and being responsive to oscillations developed in said transistor device in said oscillator operation or in said amplifier operation thereof to become energized, said transistor device being connected through said manually selective switch to the output of one track of said recording and reproducing device and to the input of said one track of said recording and reproducing device whereby when said manually selective switch is in said first fixed position thereof, the transistor device amplifies recorded oscillations from said recording and reproducing device to energize said relay circuit and operate said slide projector changing mechanism and when said manually selective switch is momentarily placed in the momentary position thereof said electron device generates oscillations which are recorded by said recording and reproducing device while at the same time energizing said relay circuit to operate said slide projector, said recorded signals being subsequently reproducible to repeat the slide sequence.

6. An electronic tone actuated relay device having elements therein connectable to circuit components for continuous amplifier or momentary oscillator operation, said device comprising:

a manually selective switch having a first fixed position, a second fixed position and a momentary spring-return position;

first circuit component means connected to said electron device and to said manually selective switch in said first fixed position thereof for amplifier operation thereof;

second circuit component means connected to said electron device and to said manually selective switch in said third momentary spring-return position thereof for oscillator operation thereof;

said manually selective switch being "off" in said second fixed position thereof;

a normally inoperative relay circuit connected with said first and second circuit means and responsive to oscillations developed in said electron device in said oscillator operation and in said amplifier operation thereof to become energized, said relay circuit being connected to an external automatic changing slide projector;

an input circuit connected between said electron device through said manually selective switch in said first fixed position thereof and the output of one track of an external recording and reproducing device; and an output circuit connected between said electron device through said manually selective switch in said momentary spring-return position thereof and the input of said one track of said recording and reproducing device whereby when said manually selective switch is in said first fixed position thereof, said electron device amplifies recorded oscillations from said recording and reproducing device to energize said relay circuit and operate said slide projector changing mechanism and when said normally selective switch is momentarily placed in the momentary position thereof said electron device generates oscillations which are recorded by said recording and reproducing device while at the same time said relay circuit is energized to operate said slide projector, said recorded signals being subsequently reproducible to repeat the slide sequence.

References Cited in the file of this patent

UNITED STATES PATENTS

| | | |
|---|---|---|
| 2,503,083 | Waller | Apr. 4, 1950 |
| 2,529,097 | Mullin | Nov. 7, 1950 |
| 2,575,203 | Wolfner | Nov. 13, 1951 |
| 2,787,669 | Flan et al. | Apr. 2, 1957 |
| 2,811,588 | Julie | Oct. 29, 1957 |
| 2,975,672 | Shields | Mar. 21, 1961 |